(12) United States Patent
Inoue et al.

(10) Patent No.: US 6,552,771 B1
(45) Date of Patent: Apr. 22, 2003

(54) IMAGE DISPLAY DEVICE AND ITS REPAIRING METHOD AND APPARATUS

(75) Inventors: Takashi Inoue, Yokohama (JP); Shigenobu Maruyama, Ebina (JP); Toshio Asano, Yokohama (JP); Susumu Aiuchi, Yokohama (JP); Takeo Sawaguchi, Mobara (JP); Rokuro Watanabe, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/461,730

(22) Filed: Dec. 16, 1999

(30) Foreign Application Priority Data

Dec. 18, 1998 (JP) .......................................... 10-360287
Nov. 19, 1999 (JP) .......................................... 11-329213

(51) Int. Cl.$^7$ ............................................ G02F 1/1336
(52) U.S. Cl. ........................................ 349/158; 349/122
(58) Field of Search ................................ 349/122, 158, 349/192

(56) References Cited

U.S. PATENT DOCUMENTS 5,514,850 A * 5/1996 Miyazaki et al. ...... 219/121.69
6,087,191 A * 7/2000 Boggs ........................ 438/12

FOREIGN PATENT DOCUMENTS

JP            11231296            8/1999

* cited by examiner

Primary Examiner—James Dudek
(74) Attorney, Agent, or Firm—Antonelli, Terry, Stout & Kraus, LLP

(57) ABSTRACT

An image display device for repairing a scratch or scratches on a surface or surfaces of a light transmitting member having an image display section such an extent that the presence of the scratch or scratches cannot be visually perceived at at least in a bright view distance in all directions, and in which device a liquid filler having a refractive index equivalent to or on the same order of that of the light transmitting member is locally filled only into an area of the scratch or scratches, and the filler is cured. By controlling an amount of the filler so that a difference in level between a surface of the light transmitting member and a surface of the filler is at least ±5.0 μm or less and that an angle defined between a surface of the filler and a surface of the light transmitting member is at least 45 degrees or less or preferably at least 10 degrees or less, it is possible to exhibit display quality to such a degree that the presence of the scratch or scratches cannot be recognized.

10 Claims, 14 Drawing Sheets

RESULTS OF EXPERIMENT

| No. | MAX. DEPTH OF SCRATCH (μm) | LOCATION OF SCRATCH | MAX. HEIGHT OF FILLER PROJECTION H (μm) [1] | SIZE OF REPAIRED PORTION W (μm) [1] | LENGTH AND WIDTH RATIO OF REPAIRED PORTION H/W (TAPER ANGLE θ (DEGREE)) [1] | CHECKING OF APPEARANCE AFTER STICKING OF POLARIZER |
|---|---|---|---|---|---|---|
| 4 | 23.0 | TFT SURFACE | 5.2 | 270 | 0.019[2.2] | ○ |
| 5 | 13.8 | CF SURFACE | 6.7 | 350 | 0.019[2.2] | ○ |
| 6 | 41.9 | TFT SURFACE | 10.6 | 400 | 0.026[3.0] | ○ |
| 7 | 15.2 | TFT SURFACE | 7.0 | 242 | 0.029[3.3] | ○ |
| 8 | 10.2 | TFT SURFACE | 12.2 | 388 | 0.031[3.6] | ○ |
| 9 | 13.0 | TFT SURFACE | 9.0 | 200 | 0.045[5.1] | ○ |
| 10 | 19.4 | TFT SURFACE | 12.9 | 160 | 0.081[9.2] | × |
| 11 | 17.0 | TFT SURFACE | -2.7 [2] | 175 | -0.015[-1.8] | ○ |

1) REFER TO FIG.14 WITH RESPECT TO THE DEFINITION OF MAX. HEIGHT H OF FILLER PROJECTION, SIZE W OF REPAIRED PORTION, AND TAPER ANGLE θ.
2) NEGATIVE SIGN INDICATES "CONCAVE".

IMAGE DISPLAY DEVICE AND ITS REPAIRING METHOD AND APPARATUS

BACKGROUND OF THE INVENTION

The present invention relates to a non-light emitting or light emitting type image display device, and more particularly to an image display device, a correcting method and a correcting apparatus in which scratches on a panel glass surface in an image display section are repaired, and which are useful particularly in a thin film transistor-liquid crystal display (hereinafter abbreviated as TFT-LCD) or a plasma display panel (hereinafter abbreviated as PDP).

FIG. 1 is a schematic view showing the sectional structure of a well known TFT-LCD as a typical example of the prior art. The drawing shows three scratches 113 formed by mistake on the surface of a glass panel 106 in a display section. The scratches 113 are often observed when a manufacture apparatus contacts the glass surface in the manufacture process. Furthermore, the scratches 113 are formed particularly at locations where a glass substrate is held on a vacuum suction stage, and frequently generated by foreign matters caught between the substrate and the stage.

Environment management is performed at the manufacture site so as to reduce as much foreign matters as possible in the process, but it is impossible to completely eliminate foreign matters, so that scratches 113 on the glass surface are generated in a statistical frequency. Moreover, it is impossible to check amounts of foreign matters generated every process, and actually in many cases the presence of the scratches 113 formed on the glass surface is found for the first time in the final manufacture process of liquid crystal display panels, i.e., in the lighting inspection and whole appearance inspection performed before a polarizer 111 is applied to a liquid crystal display panel. Furthermore, back light is scattered by portions of the scratches 113, and the display quality in liquid crystal displays is frequently deteriorated to an extent which cannot be ignored.

Since such liquid crystal display panels have gone through many processes, their added value is high. Therefore, loss of resources involved in disposal of such liquid crystal display panels in this stage cannot be ignored even if such disposal is low in frequency. Therefore, from the standpoint of social request for the conservation of environment resources, it is desired to repair the glass surface scratches 113 by means of some measures.

To solve the above-described problem, the following prior art has been generally used. More specifically, when a scratch or scratches are found on a glass surface in a display section of a liquid crystal display, a method has been employed, in which abrasion of the scratch or scratches and a portion or portions around the scratch or scratches is performed until such scratch or scratches are eliminated. This method is effective for a relatively shallow scratch or scratches having a depth of several $\mu$m or less, but is not entitled to be practical because such abrasion takes much time in the case of repairing a deep scratch having a depth of more than 10 $\mu$m. Further, there is offered a problem that it is even difficult to repair a wide scratch as compared with the above-described scratch, for example, when a micro crack develops deeply.

On the other hand, a method of repairing that scratch which cannot be treated by way of abrasion is disclosed in Japanese Patent Unexamined Publication No. 150205/1993 or 118401/1994.

More specifically, the technique disclosed in the Japanese Patent Unexamined Publication No. 150205/1993 comprises a method of dripping a liquid organic resin having a refractive index equivalent to or on the same order of that of a material of a glass substrate onto a scratch of the display panel glass substrate with a dispenser, which mounts a needle at a tip end thereof, thermosetting the resin, abrading a surplus resin remained around the scratch with a grinder, and flatting the glass surface.

The prior art document, however, has no detailed explanation of configuration and size of the needle mounted to the tip end of the dispenser, and supply condition of the organic resin and so on, and in no way numerically describes a situation, in which the organic resin is filled inside the scratch when the repair has been completed. Therefore, a standard used in judging to what extent the scratch is repaired or whether or not the object is attained is very vague, and it is difficult to judge the effectiveness of this technique.

Moreover, like the above-described prior art, the technique described in the Japanese Patent Unexamined Publication No. 118401/1994 comprises a method of filling the scratch with a liquid organic resin having a refractive index equivalent to or on the same order of that of the panel glass material, and thermosetting the resin.

However, this technique in no way details concretely how to fill the organic resin. Furthermore, a configuration of a portion, for which the scratch is repaired, is in no way described quantitatively, and it cannot but be said that it is difficult to precisely judge the effectiveness of the technique.

SUMMARY OF THE INVENTION

The inventors of the present application actually filled an organic resin in a scratch formed on a glass surface of a liquid crystal display panel on the basis of the above-described prior art, and have found that there are involved the following many problems and that the object cannot easily be achieved.

First, with reference to FIG. 2, an explanation will be given to a method of filling a liquid organic resin into a portion with a glass scratch on a panel surface, thermosetting the resin, and shaving off a surplus resin. When it is taken into consideration that the smaller an amount of the surplus resin, the easier the disposal thereof in the event of removing the surplus resin by means of some measures, it is desirable to supply an optimum amount of the resin, conformed to a volume of the scratch as far as possible, only into the scratch. A glass scratch 202 is various in size depending upon a size of a foreign matter responsible for the scratch such that various scratches are generated including a small scratch of about 50 $\mu$m and a large scratch exceeding 500 $\mu$m. Furthermore, the scratch 202 has a depth in the range of several $\mu$m to several tens of $\mu$m, and is also various in configuration.

Here, exemplifying a rectangular parallelepiped groove of 50 $\mu$m in width, 100 $\mu$m in length, and 5 $\mu$m in depth for the typical size of the glass scratch 202 as shown in FIG. 2A, this scratch is of 25000 $\mu$m$^3$ in volume. To precisely supply a minimum amount of resin (amounting to the volume of the scratch) into this scratch, it is essential to employ an injecting method in which an amount of the resin discharged at a time is made exceedingly small and is controllable. Concretely, it is required for the method to control the amount of the resin discharged at a time to at least 1000 to 5000 $\mu$m$^3$. Therefore, the filling of the resin into the scratch is implemented by repeating the above-described high precision discharging, and a tool capable of discharging a small amount of liquid drop is necessary in order to fill the scratch with the minimum amount of the resin.

Here, an experiment has been conducted using a micro-syringe of the smallest volume (volume of 10 μL) among commercially available micro-syringes (small-sized syringes) for gas chromatography. Incidentally, this micro-syringe had a minimum graduation of 1 μL and a volume corresponding to that of a rectangular parallelepiped ($10^9$ $\mu m^3$) with each side of 1 mm, the volume being extremely great as much as $4 \times 10^4$ times the volume of the above-described scratch of the typical size. More specifically, it is not possible with conventional syringes or dispensers to perform an operation of pouring the resin only into the area of the scratch 202 on a glass substrate 201. Actually, if the above-described micro-syringe is used to fill a liquid epoxy resin or the like into the scratch and the resin is then thermoset, as shown in FIG. 2B, it is only possible to supply a considerably excessive amount of the resin. In this case, the surplus resin had a difference in level, which far exceeded 150 μm. Therefore, to implement injection of a filler 203 conformed to the volume of the scratch 202 and supply only an amount of the resin corresponding to the volume of the scratch 202, a technique capable of extremely minimizing an amount of the resin discharged at a time is necessary.

A second problem is the pressing necessity of a technique of removing the surplus resin, on the assumption of supplying of the relatively excessive filler 203 as described above.

For example, it is disclosed in the Japanese Patent Unexamined Publication No. 150205/1993 to remove a surplus resin by means of an abrasive and a grinder. Hereupon, the above-described small-sized micro-syringe was used to fill the resin into the scratch 202 as shown in FIG. 2A, and the resulting surplus filler having a shape shown in FIG. 2B was subjected to grinding by the grinder or cutting by a cutter, and then there was obtained the shape shown in FIG. 2C. More specifically, there was caused a problem that the filler 203 partly fell off, the filler 203 was roughed at surfaces thereof, and cut residue 204 of the resin was generated around the scratch 202. So, it was difficult to perform the working for forming a flat configuration so that the filler 203 was left only in the scratch 202.

The reason for this is that the filler 203 itself was excessive in amount and liable to fall off because of a shearing force far too great in the mechanical removal of the surplus resin, and an excessive amount of the surplus resin necessitated an enhanced cutting efficiency attributable to a coarse grain size of a grinder wheel, resulting in an increase in roughness of the processed surface. Also, it is problematic that a new cleaning process must be added to remove cuttings and shavings generated by the cutting and grinding processes.

It is desirable to dispense with the cutting and grinding processes, which accompany the repairing of scratch or scratches, and it is necessary to develop a method of reducing a surplus filler as far as possible so that a simple processing suffices even when the cutting and grinding processes are executed. Thus, to facilitate the process of removing the surplus filler, it is desirable that the method comprises supplying an amount of the filler 203 corresponding to the volume of the scratch 202 with good precision. More desirably, an ultra-high precision filling method is used to supply the filler 203 only into the scratch 202 to permit the resin to be cured with some measures, which will not do any damage to the entire image display device, such curing ideally making the surface of the filler 203 substantially flush with the glass surface around the scratch 202 for completion of the repair and doing away with any mechanical working.

A third problem is the positioning of the filler in the injecting process. Since scratch varies in size from several tens of μm to about several hundreds of μm, the scratch itself can be recognized with the naked eye. However, in order to inject the filler only into an area of the scratch 202 with good precision, it is impossible to attain the object by visually determining a position, to which the filler should be discharged and manually performing the work, and so it is necessary to exactly position a tip end of a filler discharge unit (e.g., the above-described micro-syringe) right above the scratch 202 at least in the field of view of a substantial microscope or an optical microscope.

Regrettably, the above-described prior documents in no way describe the necessity of the positioning operation indispensable for attaining the object. Moreover, even assuming that the accurate positioning has been effected as described above, the problem concerning the removal of the surplus filler cannot be solved with the discharge performance of the micro-syringe as described above.

A fourth problem is that, in order to repair the glass scratch 202 in the production site with good reproducibility, an appropriate method of quantitative evaluation for configuration of the scratch as restored is needed, and this problem will be described hereinafter.

Assuming that the method of precisely filling/restoring a scratch or scratches can be developed to solve the above-described problems, considerations will be given to those conditions, which configuration of a scratch or scratches as restored should meet.

First, repair of a scratch is defined by the fact "the scratch is filled with an appropriate filler to present an appropriate configuration and is finished to produce a state, in which the existence of the scratch cannot be visually recognized any more". The cause to offer a problem in terms of display that a scratch or scratches are visually recognized will be investigated in details with reference to FIGS. 3 and 4 in the case where a scratch or scratches are existent on a display panel glass surface of a TFT-LCD representative of an active matrix drive type display.

With the TFT-LCD, light entering human eyes is classified into two types, that is, light passing through an opening of the TFT-LCD from a light source being back light, and a reflected light resulting from an ambient light being reflected by the surface of the display panel. Even if repair of a scratch or scratches is incomplete, cut-off of either of optical paths of the both lights is visually perceived for recognition of the presence of the scratch or scratches.

First, in the case shown in FIG. 3, a scratch on a glass substrate 301 is accurately filled with a filler 302 having a refractive index equivalent to or on the same order of that of the glass and having substantially the same amount as a volume of the scratch, and the scratch is repaired such that a surface of the filler 302 is made substantially flush with a surface of the glass substrate 301 and has substantially the same smoothness of that of the surface of filler 302. In this case, light 303 from a back light proceeds along a normal optical path in a portion, in which the scratch is repaired, without any interference. Moreover, an ambient light 304 does not behave on the surface of the filler 302 and on the surface of the glass substrate 301 significantly differently, and an edge of the filler 302 is also contiguous to the glass in substantially the same flat surface, so that the scratch itself forms no specific point in terms of visual perception. Therefore, the scratch is completely repaired and is not visually perceived, and it can be said that ideal repair of the scratch can be realized.

On the other hand, in the case shown in FIG. 4, an amount of a filler 402 as filled slightly exceeds a volume of a scratch, and a part of the filler 402 is formed to slightly protrude outside of an edge of the scratch. Since a scratch is various in size and configuration, slightly excessive filling can practically occur even with the use of a high-precision filling method. Therefore, for the repaired configuration as shown in FIG. 4, it is important as a practical issue to establish a standard for clearly prescribing configurational limitations which cannot be visually perceived.

In addition, the case as illustrated in FIG. 4 is taken into consideration, in which the surface of the filler is substantially flat over a large part of a portion, in which the scratch is repaired, except the edge of the filler 402, and the filler 402 and the glass substrate 401 substantially coincide in refractive index with each other. In this case, the back light (1) 405 is in no way modulated at the interfaces of glass/filler and filler/air, and so advances along a normal path. Therefore, the scratch is not perceived in this area. Also, the ambient light (1) 406 is similarly free of interference on the optical path in this area, and the scratch is not perceived in this area.

However, the situation differs in the edge of the filler 402. First, when the back light (2) 407 enters an edge of the filler 402 (right edge of FIG. 4), a part of light 407 is partially reflected (408) at the interface of filler/air in a left downward direction, and at the same time the remaining light advances as an abnormal transmission light 409 in a direction offset from a straight advancing direction. Therefore, luminance distribution changes in this area, and the edge of the filler 402 is visually perceived by a user who observes the image display device.

Subsequently, in the case where the ambient light (2) 410 is incident upon the edge of the filler 402 (e.g., a left edge of FIG. 4), it branches into a reflected light 411 and a refracted light 412 at the interface of air/filler in the same manner as described above, and the both lights advance in a direction offset from a direction of incidence. Therefore, luminance distribution changes also in this area, which is visually perceived by the user. Actually, the back light 407 and ambient light 410 are modulated in an entire outer periphery, defined by the edge of the filler 402, so that the entire filler 402 is visually perceived.

In addition, the above-described phenomenon can be discussed in the same manner, in the case where the filler is slightly insufficient, for example, in the case where a surface of a filler 1202 is shaped to be slightly lower than a surface of a glass substrate 1201 as shown in FIG. 5, which will be described later. As a result, the edge of the filler 1202 is visually perceived. (Since the principle can easily be understood from the above description, the detailed description thereof is omitted.)

Furthermore, the phenomenon of modulation, which the back light and the ambient light experience, depends on tapered angles of the fillers 402 and 1202 (404 on the left edge in FIG. 4, and 1204 on the left edge in FIG. 5). More specifically, the phenomenon of modulation becomes insignificant as the tapered angles become smaller, with the result that the edge of the filler changes less in luminance change, which makes visual perception difficult. In other words, the smaller the tapered angles are, the less conspicuous the portion, in which the scratch is repaired, becomes, so that it becomes significantly meaningful to determine an optimum value of the tapered angle of the edge of the filler.

The above-described prior-art problems will be put in order and described hereinafter.

The present invention provides an image display device, typified by TFT-LCD, in which a scratch or scratches on a glass surface of an image display panel is filled with a filler having a refractive index equivalent to or on the same order of that of glass, and repaired by:
(1) performing accurate positioning for filling into an area or areas in which the scratch or scratches are present;
(2) injecting an amount of the liquid filler corresponding to the volume of the scratch or scratches only into the area or areas, in which the scratch or scratches are present, and curing the filler; and
(3) desirably using a means for finishing a configuration, in which a filler surface and a glass surface around the scratch or scratches become substantially flush with each other, to repair the scratch or scratches, and the invention provides such means.
(4) Also, the invention provides a means for applying a slight-degree precision abrasion as desired, even when the filler becomes slightly surplus (protrudes from the scratch or scratches) or insufficient for an area or areas, in which the scratch or scratches are existent, to finish an edge of the area, into which the filler is, into a tapered configuration, which cannot be visually perceived, and also an image display device, which uses such means to realize repair of a scratch or scratches.

First, in order to repair the above-described scratch on the glass surface with high precision, a technique of supplying a liquid material only to an optional minute area on the glass surface is needed. This subject can be solved by using, for example, a micro-injection apparatus disclosed in Japanese Patent Unexamined Publication No. 8514/1996, and using a method shown in FIGS. 6A to 6D. More specifically, the apparatus is used for filling a liquid filler 504 into a pipette 503 molded to have a tip end inner diameter of 1 to 10 μm, supplying an inert gas into the pipette from the other end thereof, and injecting a minute amount of the liquid material via the tip end of the pipette 503.

Concretely, a discharge port of the pipette 503 filled with the liquid filler 504 is positioned right above the scratch 502 (FIG. 6A), and the pipette 503 is lowered with its inclination kept constant to be placed in contact with the scratch 502 of a glass substrate 501 (FIG. 6B). Subsequently, a nitrogen gas 505 is supplied into the pipette 503 from behind in a pulsed manner, and the liquid filler 504 is discharged via the pipette tip end (FIG. 6C). In addition, the above-described operation is implemented in the existence of a microscope, and the pipette 503 is quickly raised from the glass substrate 501 every discharge so that the filling state in the scratch 502 is confirmed (FIG. 6D). Furthermore, when an amount of filling is insufficient, the liquid material is repeatedly discharged and the discharging is completed when it is judged the scratch 502 is completely filled with the liquid filler 504.

Here, when an amount of the liquid filler 504 discharged at a time is to be changed, it suffices to change the pressure of the nitrogen gas 505 or the pulse application time. Thereby, it becomes possible to optimize an amount of discharge of the liquid filler corresponding to a size of the scratch to perform injection of the filler with high precision.

And, the implementation of the above-described concept and the solving of the above-described problems in (1), (2) and (3) can be attained by an automatic liquid material supply apparatus provided with (a) a mechanism for mounting on a stage a liquid crystal display panel with a scratch or scratches to position the same, (b) a mechanism for observation of a surface of the liquid crystal display panel, (c) a mechanism for operating the pipette filled with the liquid material to position the same, and (d) a mechanism for supplying an inert gas to the pipette from behind in a pulsed manner to discharge the liquid material.

Concretely, after the pipette 503 molded to have the tip end inner diameter of 1 to 10 μm is filled with epoxy resin, the pipette is held, and its tip end is placed at a center of visual field in an optical observation system. Thereafter, the pipette 503 is lowered, and contact between the pipette 503 and the substrate 501 is sensed based on a state, in which the pipette tip end displaces on the surface of the substrate 501. Subsequently, the nitrogen gas 505 having, for example, a pressure of 150 kPa is supplied from behind the pipette 503 in a pulse of 50 msec in width. At this time, the tip end of the pipette 503 contacts the substrate 501 at an angle of 30 to 45°, and supplying of nitrogen in a pulsed manner causes the liquid material 504 in the pipette to be discharged from the tip end of the pipette 503 with a resolution of about 1 pL at minimum. Subsequently, after completion of supplying of the nitrogen, for example, 100 msec, the pipette 503 is raised, and the pipette tip end is separated from the substrate 501, whereby it is possible to control an amount of the liquid material supplied with high precision. Incidentally, FIG. 7 shows a relationship between the number of times, in which nitrogen is supplied from behind the pipette in a pulsed manner, and an amount of the liquid material supplied, both being related to each other in a substantially proportional manner.

Finally, it goes on to curing treatment of the filler after the injection of the liquid filler. In the curing treatment, it is necessary to select the optimum condition depending upon properties of the material used, while it is possible to employ thermosetting or photo-setting on the assumption that the liquid crystal display is not damaged. As the liquid filler, a thermosetting type epoxy resin, a thermosetting type acrylic resin, a photo-setting resin, and the like can be used. It is essential that the liquid filler have a refractive index equivalent to or on the same order of that of glass used in the liquid crystal display, the liquid filler is colorless and transparent, and that the liquid filler has a high adhesion to the glass.

In addition, with the above-described micro-injection method, supplying of the liquid filler of an amount corresponding to a volume of most of scratches on the glass can be performed highly precisely, but slightly surplus filling sometimes occurs in the event of a relatively small volume of the scratch. In such case, it goes without saying that a favorable configuration of a filled portion can be obtained by, for example, using a tape grinding apparatus to grind and remove the raised portion of the surplus filler.

An important knowledge obtained by the inventors through the experiments reveals that, even when the panel surface and the filler surface fail to become perfectly flush with each other, the scratch on the glass surface cannot be visually perceived if a difference in level therebetween is within a range of ±5.0 μm, and a tapered angle formed between the panel surface and the end of the liquid material is 45 degrees or less, preferably ten degrees or less. Of course the reason for this is due to a physical reason that the difference in level between the panel surface and the filler surface, or the tapered angle formed between the panel surface and the end of the liquid material edge is small, but that, when the TFT-LCD is assembled, a polarizer is attached to the repaired glass plate via an adhesive layer of, for example, about 25 μm in thickness, to permit the adhesive layer to physically accommodate the difference in level of ±5.0 μm and to fit the tapered surface to function as an optical member for substantially eliminating the tapered surface.

BRIEF DESCRIPTION OF THE DRAWING

These and other features, objects and advantages of the present invention will become more apparent from the following description when taken in conjunction with the accompanying drawings wherein:

FIG. 17 shows results of an experiment by way of a relationship between a state of a scratch formed on a glass surface and the display quality after repair.

DETAILED DESCRIPTION OF PREFERRED EMBODIMENTS

Embodiments of the present invention will be described hereinafter in details.

Figure 8:
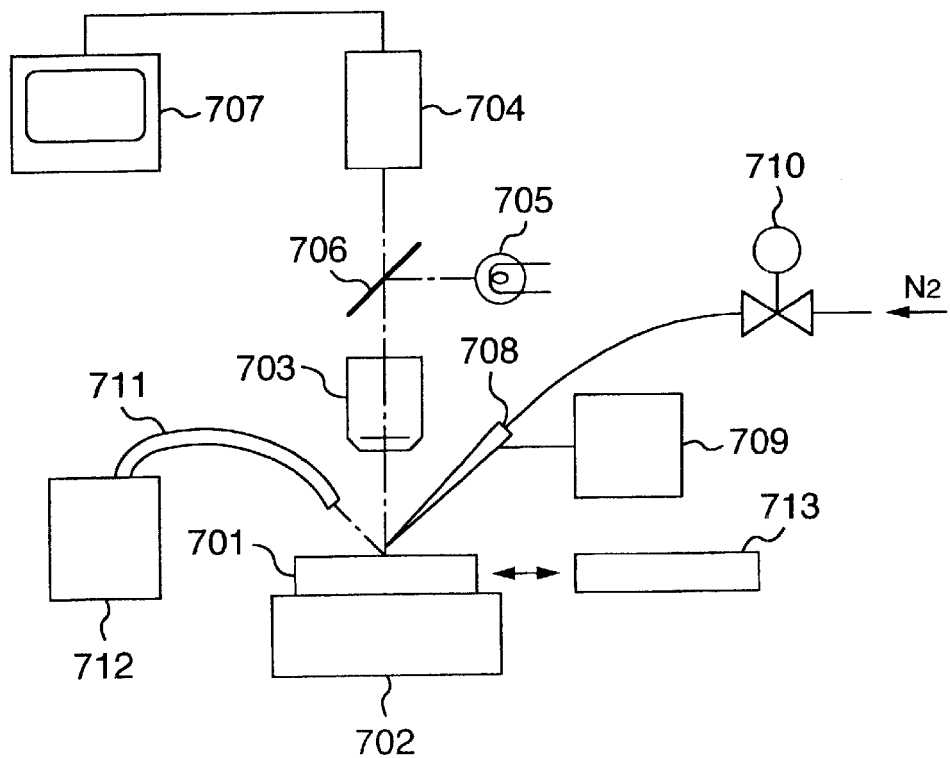
FIG. 8 is a view showing a constitution of the micro-injection apparatus used in the present invention.

FIG. 8 shows an example of an apparatus for implementing a first embodiment, and FIG. 9 shows an example of a scratch on a glass surface, which is repaired.

First, the apparatus for embodying the present embodiment comprises a stage 702 with an LCD panel 701 mounted thereon for positioning, an object lens 703 and a CCD camera 704 for observation of a surface of the LCD panel 701, a illuminating light source 705, a half mirror 706, a monitor TV 707, a pipette 708 filled with a liquid filler, a manipulator 709 for holding and positioning the pipette 708 so that the pipette contacts the surface of the LCD panel 701 at, for example, an angle of 45 degrees, an electromagnetic valve 710 for supplying, for example, $N_2$ nitrogen gas into the pipette 708 in a pulsed manner, a light source 712 for curing the liquid filler supplied onto the LCD panel 701, and a light guide 711 for radiating the light from the light source 712 onto the LCD panel 701.

The pipette 708 used herein was prepared by thermally-treating, drawing and molding a borosilicate base hard glass tube having an outer diameter of 1.2 mm and an inner diameter of 0.7 mm, and a tip end having an inner diameter of about 5 $\mu$m. A material for the pipette 708 is not required to be limited to glass. Moreover, a low-temperature curing type epoxy resin having a viscosity of 160 cps and a cured material refractive index of 1.541 was used as the liquid filler being filling in the pipette 708, but the filler is not limited to the epoxy resin provided that it possesses physical values close to the above-described physical values. Nitrogen gas under the pressure of 150 kPa is constantly supplied to a primary side of the electromagnetic valve 710. Furthermore, the manipulator 709 and the electromagnetic valve 710 are controlled by a controller (not shown).

Here, an explanation will be given to initialization of the supplying condition of the nitrogen gas to the pipette 708 used.

First, an operator uses the manipulator 709 to move the tip end of the pipette 708 into a field of view of the monitor TV 707 to focus on the tip end of the pipette 708, positions the tip end of the pipette 708 to a predetermined reference point on the monitor TV 707, and causes the controller to store the position of the manipulator 709 at that time as an initial reference position. Thereafter, the pipette 708 is retreated from the stage 702, a dummy substrate 713 is mounted on the stage 702, and the stage 702 is vertically moved to focus on the surface of the dummy substrate. Here, the dummy substrate 713 is for use in a trial experiment for setting the injection condition, and is made of the same material as that of the LCD panel.

Subsequently, instructed by the controller, the tip end of the pipette 708 is caused to slowly descend and contact with the surface of the dummy substrate 713. When the tip end of the pipette 708 contacts the dummy substrate surface, it can be confirmed on the monitor TV 707 that the tip end elastically deforms and shifts in a direction of inclination of the pipette 708. An amount of the tip end of the pipette 708 at the time of contact on the substrate is usually most suitable in the range of about 5 to 10 $\mu$m.

When contact between the tip end of the pipette 708 and the dummy substrate 713 can be confirmed, a trial experiment, in which the liquid filler is supplied, follows. Here, an amount of discharge per shot was roughly calculated in different pulse widths by fixing the pressure of nitrogen gas to 150 kPa, and changing the pulse width of supplying of the nitrogen gas between 10 msec and 300 msec.

More specifically, while the nitrogen gas supply pulse width was changed, an operation was repeated, in which the tip end of the pipette 708 was brought into contact with the surface of the dummy substrate 713, the liquid filler was discharged one shot, the pipette 708 was retreated 100 $\mu$m upward 0.1 sec later after the discharge, and subsequently the stage was moved 1 mm.

After the above-described series of trial experiment was completed, the dummy substrate 713 was placed into, for example, a hot-air drying furnace to be heated therein at 100° C. for two hours, thus permitting the resin being the liquid filler to be cured. A configuration of the spot-shaped cured product formed in this manner was measured using, for example, a laser microscope, volumes of the respective spot-shaped cured products were roughly calculated by means of the triangular pyramid approximation, and the discharge condition was determined.

As an example, on the condition that the nitrogen gas pressure was 150 kPa and the pulse width was 30 msec, an amount of epoxy resin discharged per shot was about 5 pL (5000 $\mu$m$^3$) in terms of a volume after thermosetting.

An example of using the above-described condition to repair a scratch formed on a glass surface of the TFT-LCD will be described with reference to FIG. 9. In addition, the TFT-LCD in the embodiment uses a glass material, which is one type of borosilicate glass having a refractive index of 1.54.

Figure 9A:
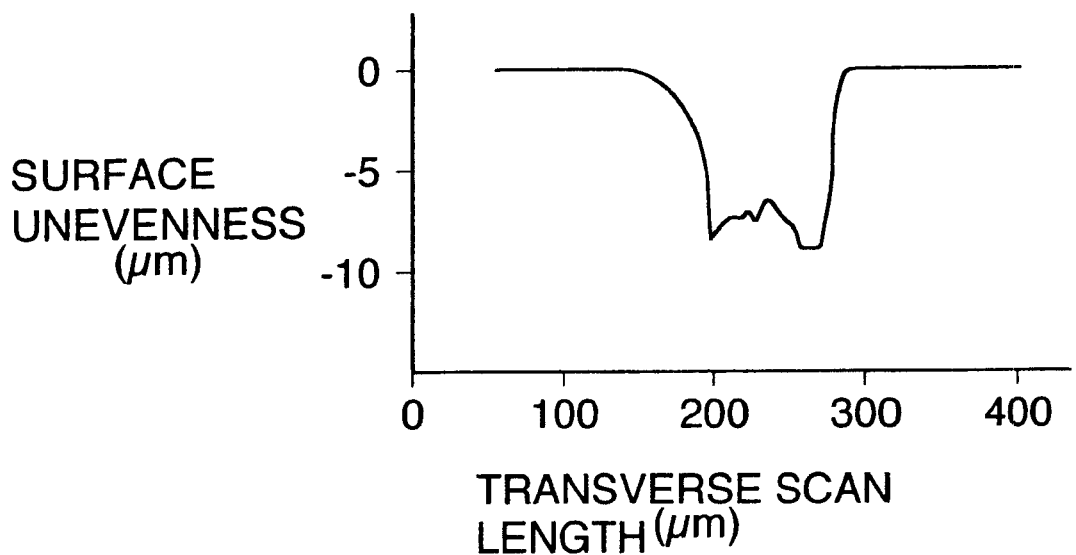
FIGS. 9A and 9B are views illustrating a state, in which a filler is supplied into a scratch on glass according to a first embodiment of the present invention, FIG. 9A showing the scratch in an initial state, and FIG. 9B showing the scratch after repair.

The TFT-LCD used in the experiment had an about 3 mm long fretting scratch on the glass surface, which could easily be perceived with the naked eye. A well-known stylus type surface roughness meter was used to measure a depth of the scratch to reveal the maximum depth of 9.4 $\mu$m, as shown in FIG. 9A. The low-temperature curing type epoxy resin was injected into the scratch under the above-described set condition. Since the scratch was elongated, the stage 702 and the pipette 708 were repeatedly moved so that successive discharge was repeated while a position of discharge was moved in the longitudinal direction of the scratch. This operation was performed while confirming an extent of filling on the screen of the monitor TV 707. The liquid filler was supplied 320 times from the pipette 708, but the total duration of the actual operation was about 15 minutes at most because the short pulse drive was repeated,.

After judging on the screen of the monitor TV 707 that the filling was completed, the TFT-LCD panel after the filling was heated for about two hours in, for example, the hot-air drying furnace (about 100° C.), which was filled with the nitrogen atmosphere, whereby the resin being the liquid filler was cured.

In addition, a method of curing the liquid filler is not limited to the use of the above-described hot-air drying furnace provided that curing is possible with the use of another heat source.

Figure 9B:
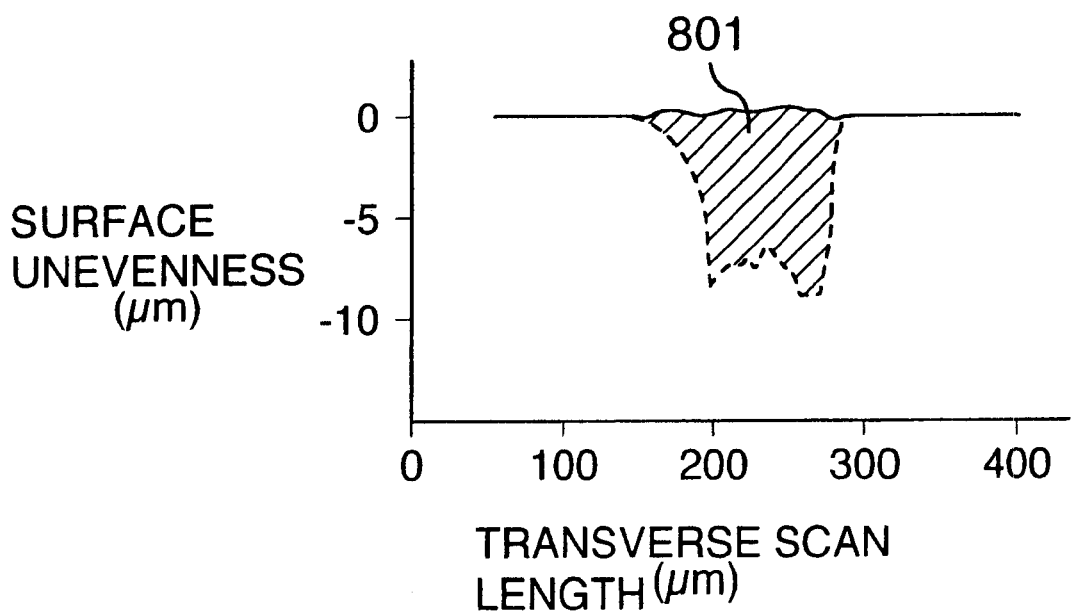

Measurement of substantially the same location before and after the repair reveals that a surface configuration of the scratch having been repaired through the above-described operation had an irregularity (concave/convex difference) around 0.7 $\mu$m as shown in FIG. 9B, and an edge configuration of the resin 801 filled was extremely smooth. More specifically, measurement of surface roughness in the longitudinal direction of the scratch reveals that surface smoothness after the repair was uniform, and the existence of the scratch could not be perceived at least in a bright field of view.

In addition, the surface configuration data shown in FIGS. 9A and 9B are adjusted in terms of aspect ratio of the graph from the indication point of view, and so the abscissa must be enlarged in scale by about 13 times in order to grasp the actual configuration as an image.

In this manner, the relatively low-viscosity resin is used as the filler, whereby the resin surface after curing is extremely smoothly finished, and so the scratch can be repaired without application of any finishing process.

Figure 10:
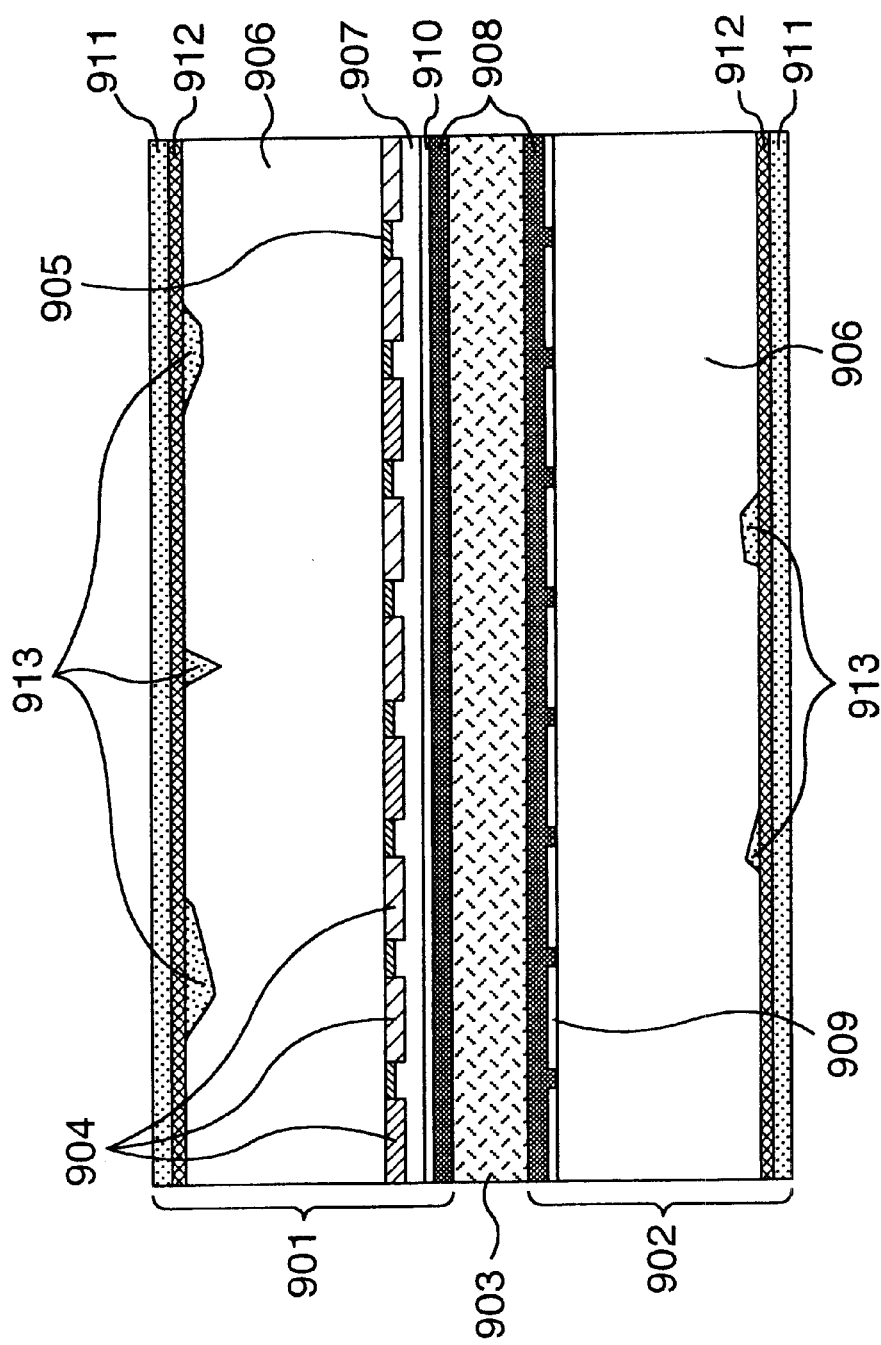
FIG. 10 is a sectional view showing a TFT-LCD, of which a scratch on a glass surface has been repaired.

After the above-described technique was used to repair the scratch on the glass surface, an adhesive material 912 was used to stick a polarizer 911 to the glass surface through a predetermined process, thus completing the liquid crystal display. FIG. 10 is a schematic sectional view showing the display. Here, adhesion of a liquid filler 913 (epoxy resin) filled in the scratch and a glass plate 906 is extremely close, and likewise this epoxy resin 913 also adheres well to the adhesive material 912 on the back surface of the polarizer 911.

When the above-described liquid crystal display is operated in a well-known usual manner, light from a back light (not shown) incident from the side of TFT substrate 902 passes through a liquid crystal 903 and a color filter substrate 901 to exit to the outside (on a side of an observer). At this time, a part of the light passes through a portion on the scratch of the glass surface, but the filler 913 (epoxy resin) fills the scratch to make a surface configuration thereof smooth, so that the portion behaves as if it were a normal glass surface.

As described above, even if the glass surface may happen to be scratched by some reason in the manufacture process of the TFT-LCD, it is possible to repair the scratch by filling only a portion on the scratch with the filler, for example, epoxy resin, having a refractive index equivalent to or on the same order of that of glass. It has been confirmed that the liquid crystal display using the TFT-LCD repaired exhibits a display characteristic and reliability adequately comparable to those of a so-called non-defective liquid crystal display free of any scratch, and can be delivered to the market as having the same specification as that of the non-defective display.

A second embodiment will next be described with reference to FIGS. 11A and 11B.

In the present embodiment, a photo-setting type acrylic resin was used as the liquid filler. The photo-setting type acrylic resin was a visible ray curing type resin having a viscosity of 150 cps and a cured material refractive index of 1.48 and exhibiting a sufficient photosensitive characteristic in a visible ray area up to around a wavelength of 450 nm.

A method similar to that of the above-described first embodiment was used to fill the resin into a scratch. More specifically, the pipette 708 shown in FIG. 8 was filled with a photo-setting acrylic resin, and the resin was supplied on the condition that the nitrogen gas pressure was 150 kPa and the pulse width was 30 msec. In addition, since the resin was a photo-setting type resin, the operation was performed in a dark room for the purpose of preventing the resin from being cured by observation light during the operation, and a filter for cutting a short wavelength light of 450 nm or less was used for the light from the light source.

Since the external shape of the scratch present on the glass surface was similar to that in the first embodiment, the resin was supplied in substantially the same manner as in the first embodiment, and the number of times, in which the resin was discharged was 390. And, a short wave-length visible light was radiated to a region where supplying of the resin was completed, via the light guide 711 from the light source 712 for curing the resin, shown in FIG. 8. The light source used had an illuminance of 43 mW/cm² in a wavelength of 420 nm, and the irradiation duration was set at 30 sec. In this case, the irradiation energy amount was 1300 mJ/cm².

Figure 11A:
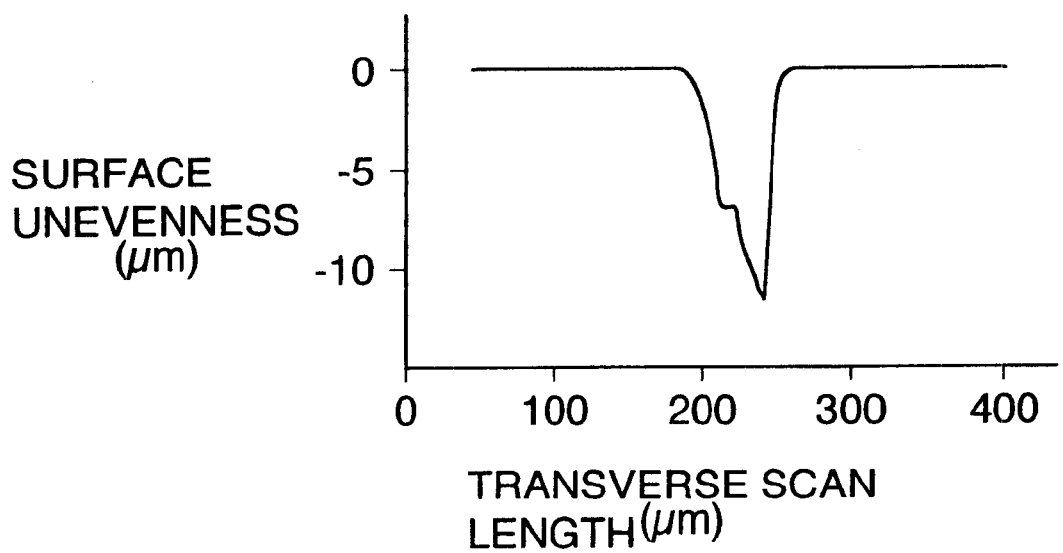
FIGS. 11A and 11B are views illustrating a state, in which a filler is supplied into a scratch on glass according to a second embodiment, FIG. 11A showing the scratch in an initial state, and FIG. 11B showing the scratch after repair.
Figure 11B:
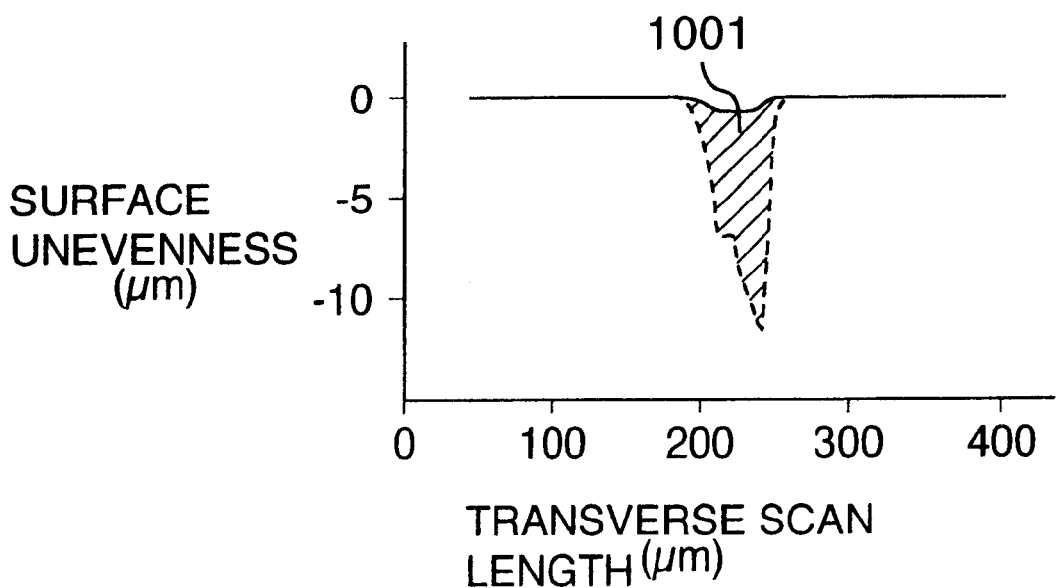

A configuration of the scratch present on the glass surface at the initial stage and after resin filling/photo-setting was measured using the well-known probe type surface roughness meter, the result of measurement being shown in FIGS. 11A and 11B. While the scratch at the initial stage had a depth of 11.6 μm at maximum, but after the repair it had a measured depth of about 0.9 μm (FIG. 11A) at substantially the same location (FIG. 11B). The scratch was repaired over the entire to such an extent that it could not be visually perceived at least in the bright view field range.

As shown in FIGS. 11A and 11B, an amount, by which the scratch was filled, is slightly insufficient in the present embodiment, but a steep difference in step is eliminated in the area where the scratch is present, and this apparently suppresses generation of inadvertent light scattering and refraction.

Moreover, in the present embodiment, the use of the photo-setting type resin as the filler 1001 for a scratch or scratches enables curing the resin cured in an extremely short time and completing the repair, for which a simple equipment suffices to serve, thus offering adequate convenience from the standpoint of productivity.

A third embodiment will be described with reference to FIGS. 12A to 12C, in which a processing was performed on a scratch, which was slightly excessively filled, and surfaces of the filler 1101 was finished to have substantially the same surface as the glass surface.

In the present embodiment, a scratch caused on a glass surface was repaired by using a low-temperature curing type epoxy resin as the filler in the same manner as in the first embodiment, supplying the resin under the same discharge condition as in the first embodiment, and subsequently curing the resin in the well-known hot-air drying furnace under the nitrogen atmosphere of 100° C. for two hours. Here, times, in which the resin was discharged was 436.

Figure 12A:
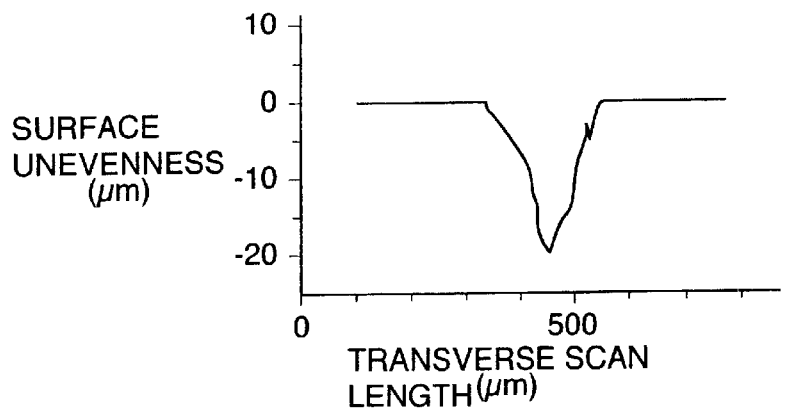
FIGS. 12A to 12C are views illustrating a state, in which a filler is supplied into a scratch on glass according to a third embodiment, FIG. 12A showing the scratch in an initial state, FIG. 12B showing the scratch after injection of a filler, and FIG. 12C showing the filler and the glass substrate after polishing.
Figure 12B:
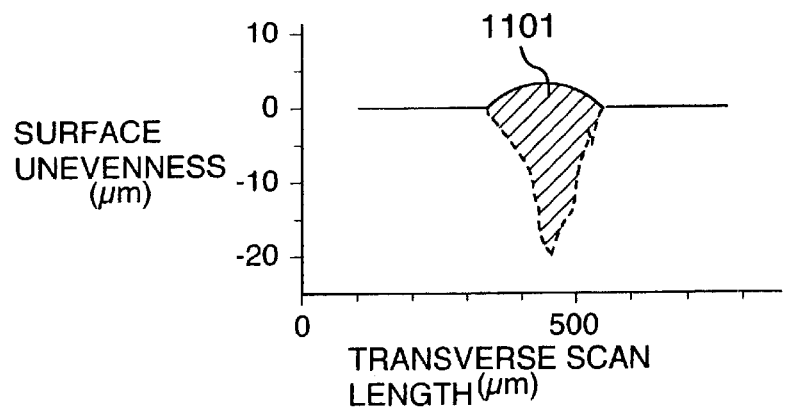
Figure 12C:
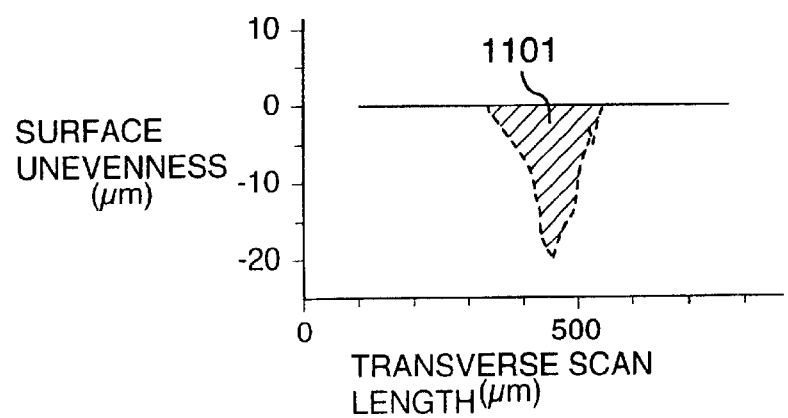

FIG. 12A shows the scratch before being filled with the resin, the scratch having a depth up to 20 μm. On the other hand, a surface configuration after the filling of the resin was convex and had a height of about 3 μm, as shown in FIG. 12B. As compared with the surrounding glass surface, a convex configuration, for which the scratch was repaired, having a height of about 3 μm can be adequately visually perceived for the reason of a large tapered angle. With such convex configuration in this state, light is unusually refracted or scattered, and so it is impossible that the liquid crystal display exhibits a satisfactory function.

Therefore, while it was necessary to perform again a flatting processing on the convex portion where the scratch was repaired, the processing was performed in the present embodiment with the use of a tape polishing apparatus said to be generally capable of performing a precise processing. More specifically, while pure water was supplied to an area being polished (the convex shaped portion after filled with the resin), tapes of mesh #4000 and #8000 were used to successively perform tape polishing. In this case, a change in configuration of a portion where the scratch was repaired was successively observed with the well-known laser microscope, the course of the polishing was monitored, and an external appearance of the portion where the scratch was repaired was observed at a visual distance (about 25 cm).

A surface of the portion where the scratch was repaired was polished until it finally became flat as shown in FIG.

12C. Therefore, it was not possible in the final finished configuration to perceive the portion where the scratch was repaired from a bright view distance. More specifically, a portion where a scratch is present can be adequately repaired with the combined use of the resin filling and the tape polishing even when such portion is slightly excessively filled.

A fourth embodiment will be described hereinbelow with reference to FIGS. 13A to 13E.

Figure 13A:
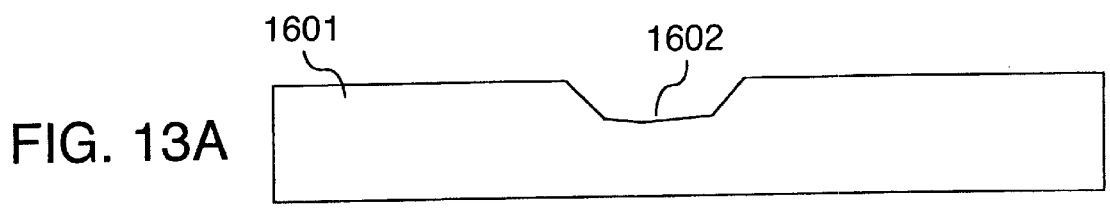
FIGS. 13A to 13E are views illustrating the manner, in which flatting is performed with a resin uncured.
Figure 13B:
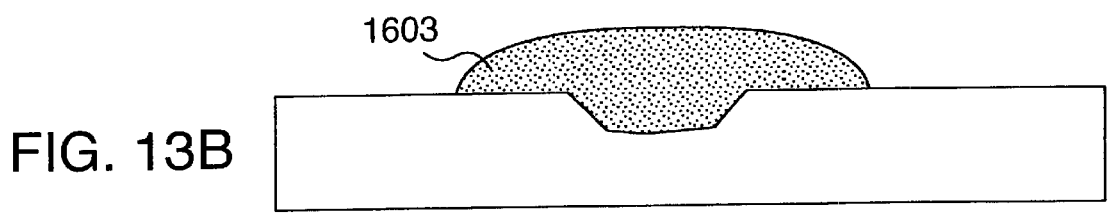
Figure 13C:
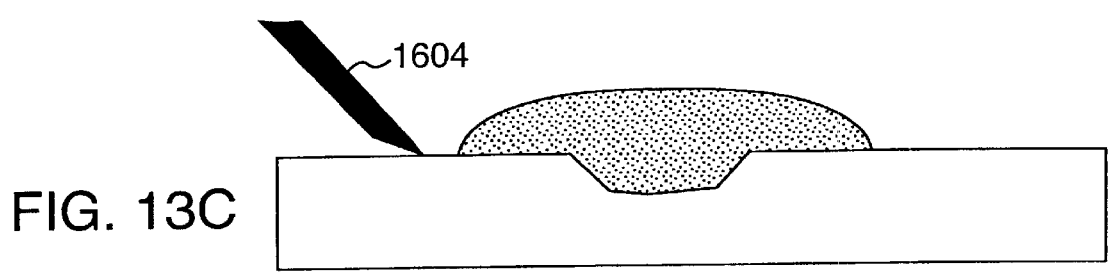
Figure 13D:
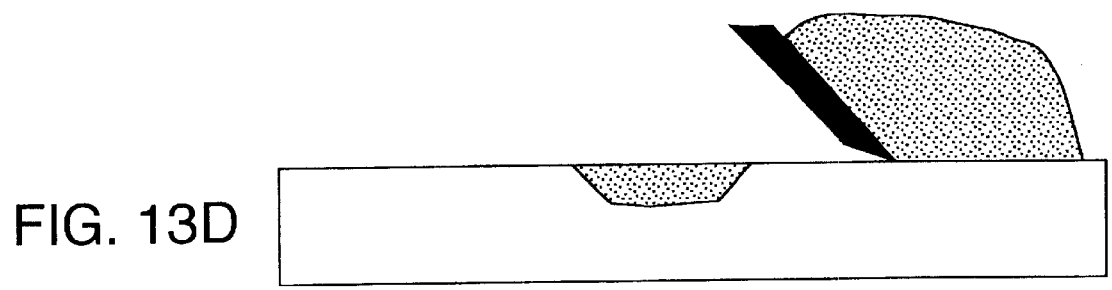
Figure 13E:
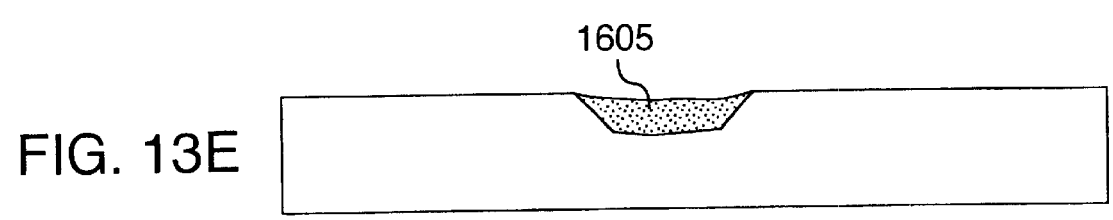

A scratch 1602 caused by some reason was present on a surface of a glass 1601 (FIG. 13A). A liquid filler 1603 was supplied to the scratch 1602 in the method described above with respect to the first to third embodiments. In this case, the filler 1603 was supplied to the scratch 1602 to completely fill (FIG. 13B). Subsequently, when the filler 1603 was half cured, a well-known squeegee 1604 or the like was used to remove the excessively supplied filler 1603 so that a surface of the filler 1603 became substantially flush with a surface of the glass 1601 (FIGS. 13C, 13D). Thereafter, the method described above with respect to the first to third embodiments was used to cure the filler 1603 as at 1605, thus completing repair of the scratch 1601 (FIG. 13E).

A configuration of an edge of the resin filled be means of the above-described method was extremely smooth upon measurement of surface roughness, and the presence of the scratch could not be perceived at least under a bright field situation. Moreover, in the case where, after the scratch was repaired, a polarizer was stuck to the surface of the glass through the predetermined processes to complete a liquid crystal display, a result of lighting display revealed that the portion where the scratch was repaired behaved as if it were a normal glass surface.

Figure 1:
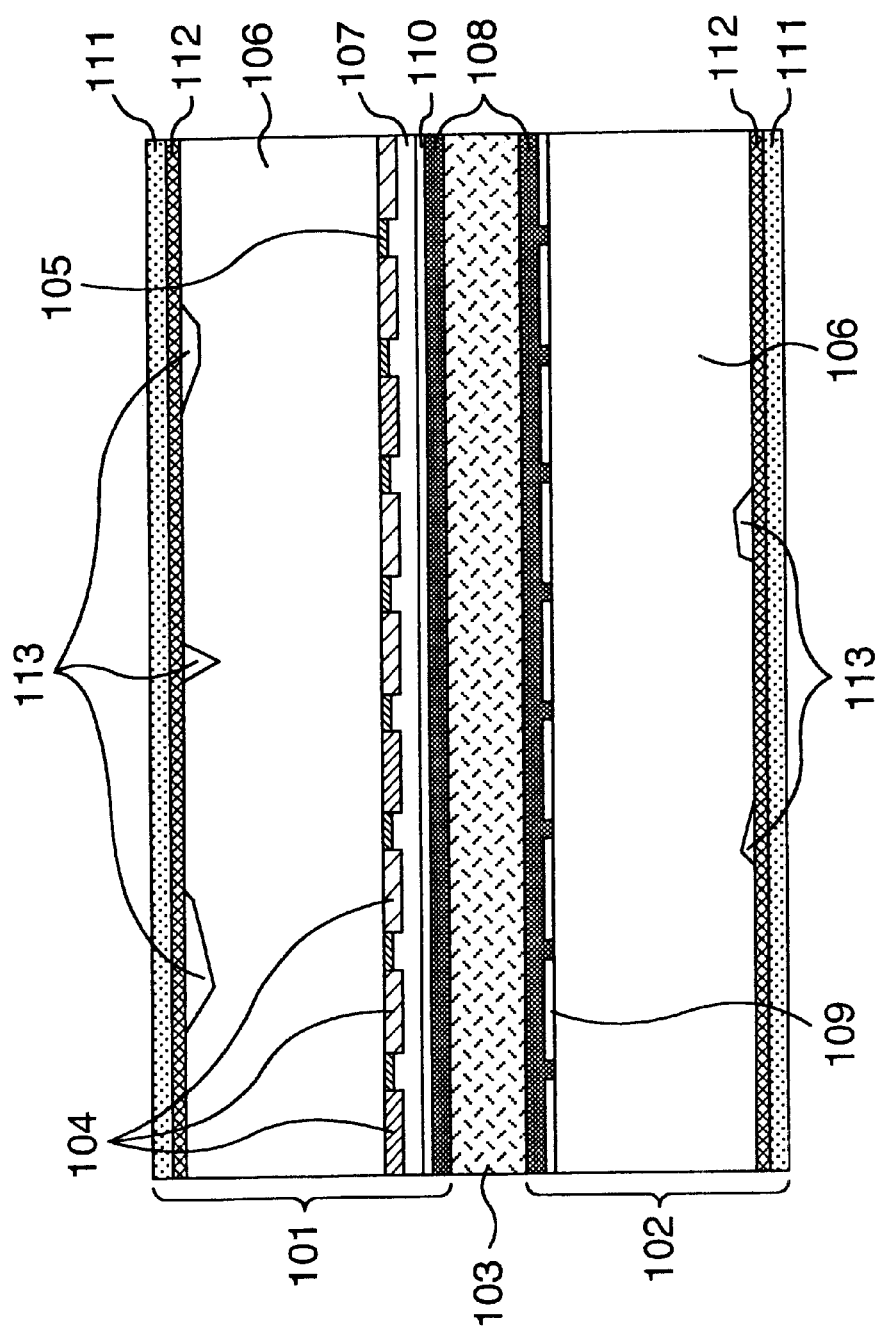
FIG. 1 is a sectional view of a TFT-LCD having scratches on a glass surface.
Figure 2A:
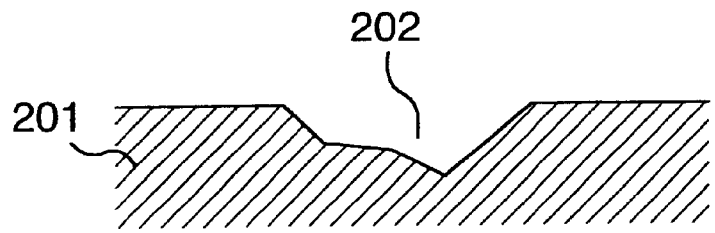
FIGS. 2A to 2C are views illustrating the manner of repairing a scratch on a glass surface using a conventional technique, FIG. 2A showing a glass substrate with a scratch, FIG. 2B showing the scratch filled with a resin, and FIG. 2C showing the glass surface after grinding or cutting the surplus resin.
Figure 2B:
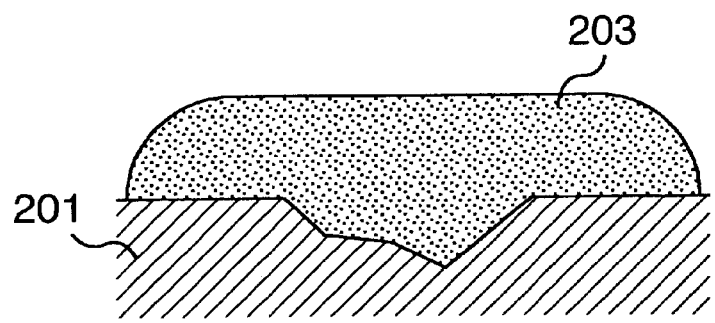
Figure 2C:
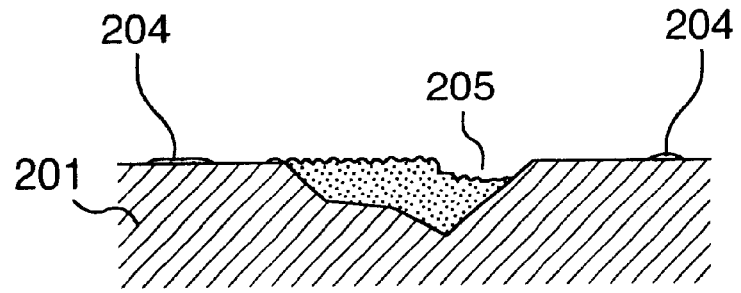
Figure 3:
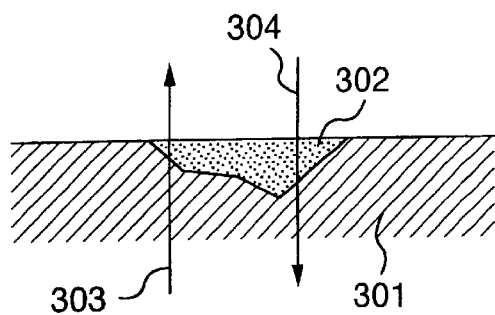
FIG. 3 is a conceptual view illustrating a scratch repaired (a filler surface and a glass surface are substantially flush with each other)
Figure 4:
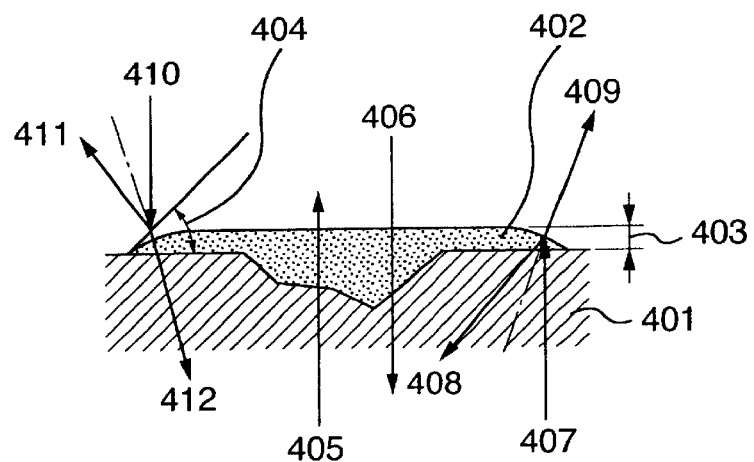
FIG. 4 is a conceptual view illustrating a scratch repaired (an amount of a filler exceeds a volume of a scratch)
Figure 5:
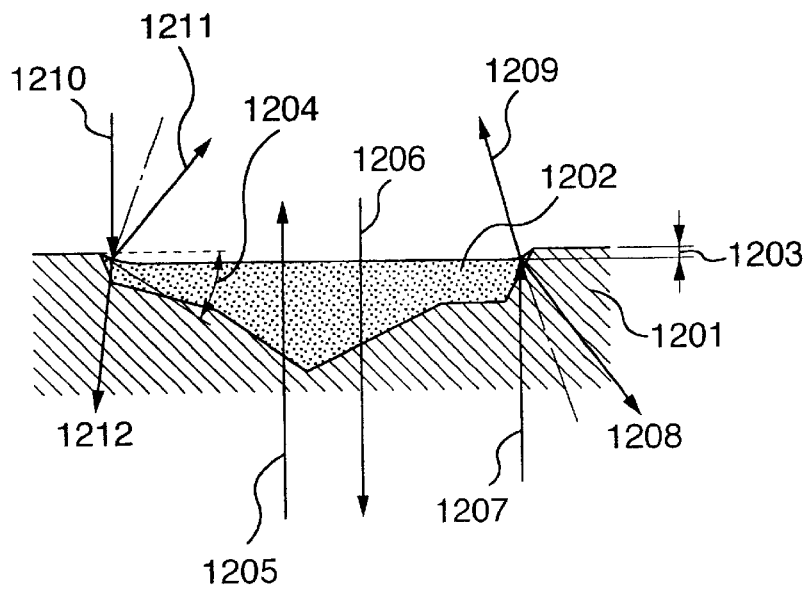
FIG. 5 is a conceptual view illustrating the behavior of light incident upon the repaired scratch (an amount of a filler is slightly less as compared with a volume of a scratch)
Figure 6A:
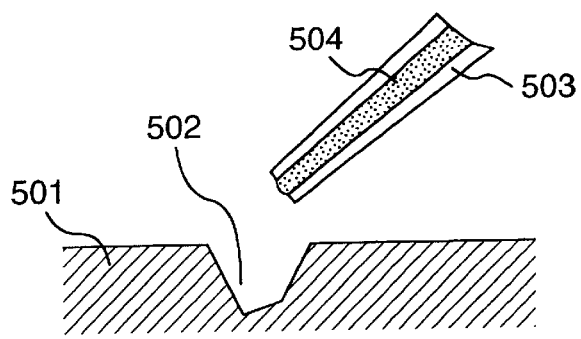
FIGS. 6A to 6D are schematic views illustrating the manner, in which a minute amount of a filler is supplied with the use of the micro-injection method, FIG. 6A showing positioning of a pipette, FIG. 6B showing the pipette brought into contact with a glass substrate, FIG. 6C showing injection of a liquid filler, and FIG. 6D showing raising of the pipette from the substrate.
Figure 6B:
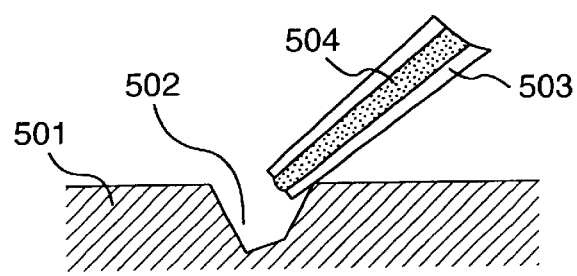
Figure 6C:
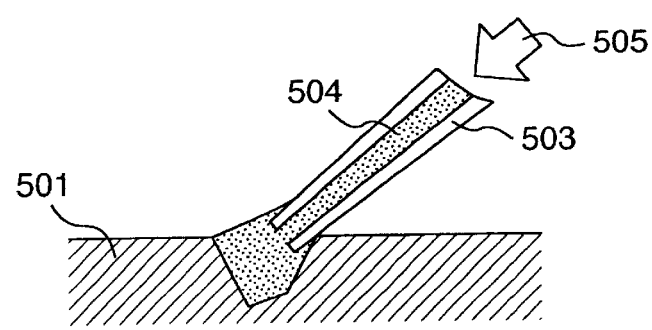
Figure 6D:
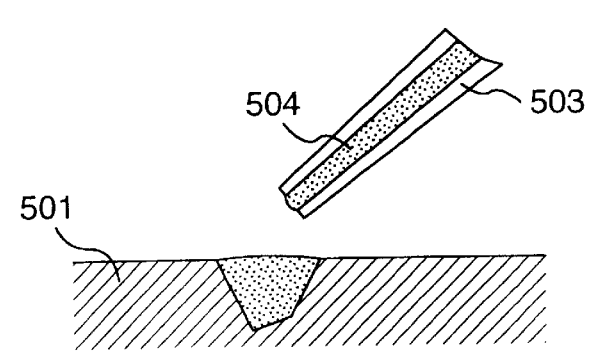
Figure 7:
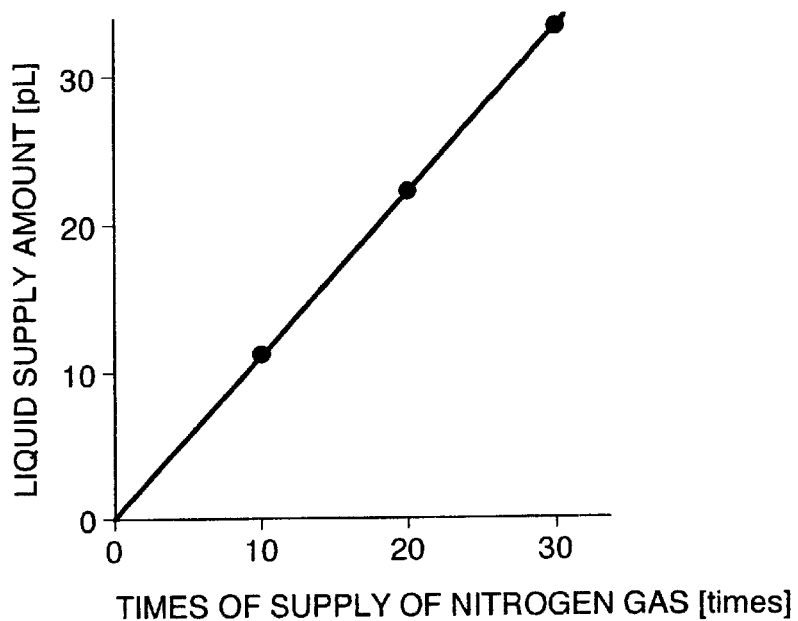
FIG. 7 is an explanatory view showing a relation between the number of times, in which nitrogen gas is supplied and an amount of a liquid filler supplied.

The first to fourth embodiments have been described above. An important knowledge obtained by the experiment carried out by the inventors reveals that, even when a glass surface fails to become completely flush with a filler surface as shown in FIG. 12C, a scratch on the glass surface cannot be visually perceived provided that a difference in level between the both is within a range of ±5.0 µm as shown in FIGS. 4 and 5, and a tapered angle defined by the glass surface and the filler edge is 45 degrees or less.

Figure 14:
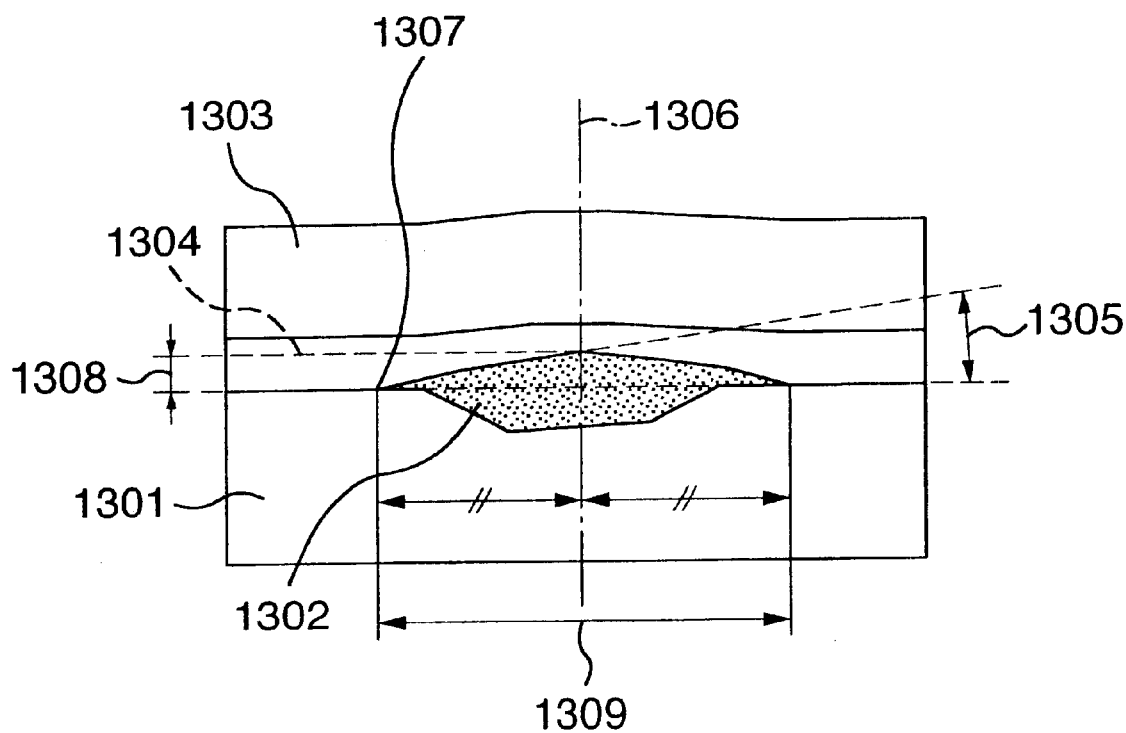
FIG. 14 is a view illustrating a state, in which a polarizer is stuck to a glass surface with a scratch repaired.

FIG. 14 is an enlarged view showing a portion where a scratch is repaired, in associated with assembly of the TFT-LCD shown in FIG. 10. In FIG. 14, a filler 1302, which fills the scratch, is shown to be convex in configuration, and a polarizer 1303 is stuck to a glass substrate 1301, which includes the filler 1302, via an adhesive material 1304 having a thickness of, for example, about 25 µm. At this time, the adhesive material 1304 serves to bury the convex portion of the filler 1302. Moreover, the adhesive material 1304 also serves to fit to the filler 1302 at an edge, that is, a tapered portion of the filler 1302 in the repaired portion to substantially eliminate the tapered surface.

The above-described matter means that, in the case where the generally frequently used adhesive material 1304 is of about 25 µm in thickness, and a difference in level (H) between the cured surface of the filler filled in the scratch and the surrounding glass surface is at most ±5 µm, the difference in level is accommodated by the adhesive material 1302.

Moreover, the smaller a ratio H/W of the difference 1308 (H) in level and a minimum width 1309(W) of the filler 1302 after curing, that is, an angle 1305 (tapered angle θ) defined between the surface of the filler and the surface of the glass 1301 at an edge of the filler 1302, the more the adhesive material 1304 accommodates an influence of the difference in level, and thus the adhesive material optically acts as if there were not any difference in level, which involves the tapered angle.

Figure 15A:
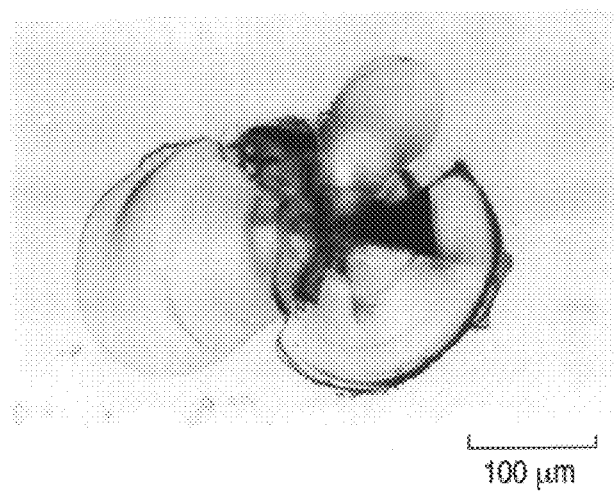
FIGS. 15A to 15C are views showing a concrete example of a scratch formed on a glass surface, FIG. 15A showing an optical microscope image, FIG. 15B showing a three-dimensional image obtained by a laser microscope, and FIG. 15C showing a sectional profile obtained by a laser microscope.
Figure 15B:
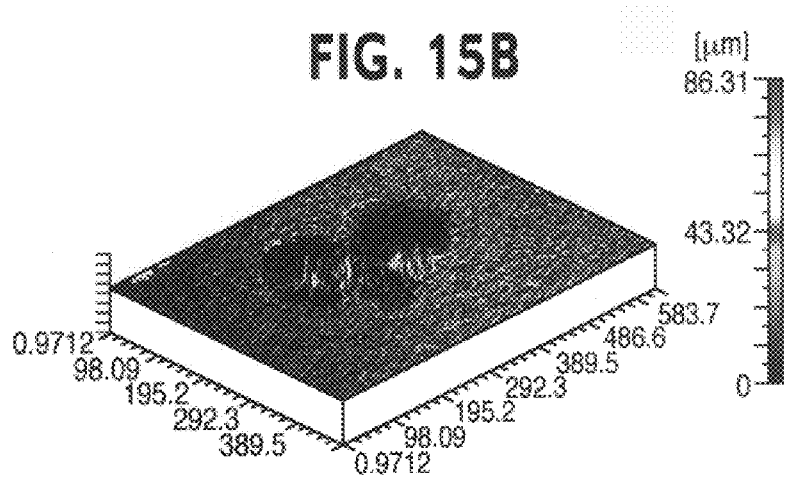
Figure 15C:
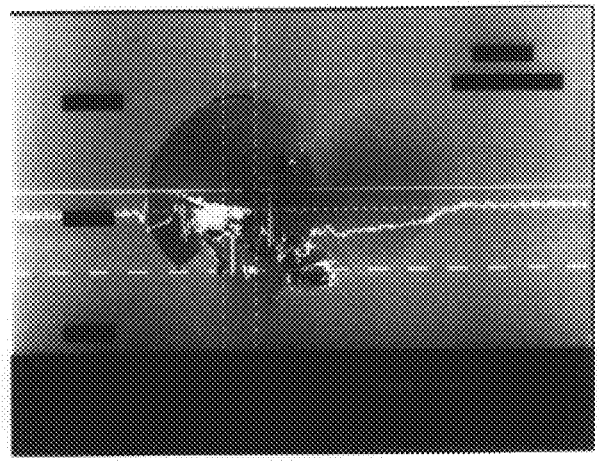

FIGS. 15A to 15C are views illustrating a concrete example of a scratch caused on a glass surface. FIG. 15A is a view showing an appearance of the scratch observed using an optical microscope, FIG. 15B being a view showing a three-dimensional image of the scratch by the observation of a laser microscope, and FIG. 15C being a view showing a sectional profile obtained with the use of the laser microscope and overlapped on an image obtained with the use of the optical microscope.

Figure 16A:
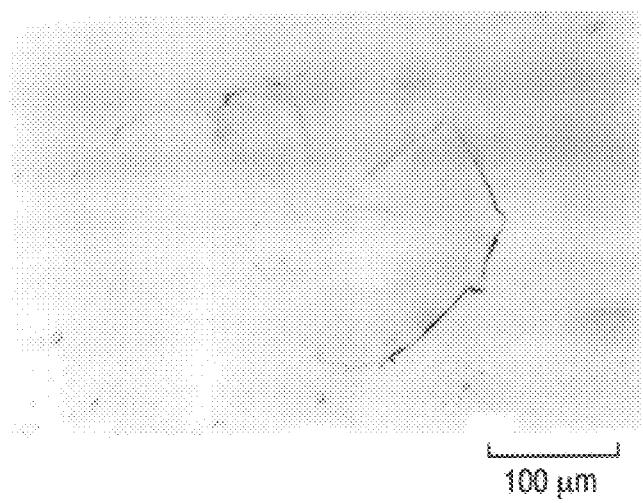
FIGS. 16A to 16C are views showing a concrete example of a scratch repaired, FIG. 16A showing an optical microscope image, FIG. 16B showing a three-dimensional image obtained by a laser microscope, and FIG. 16C showing a sectional profile obtained by a laser microscope.
Figure 16B:
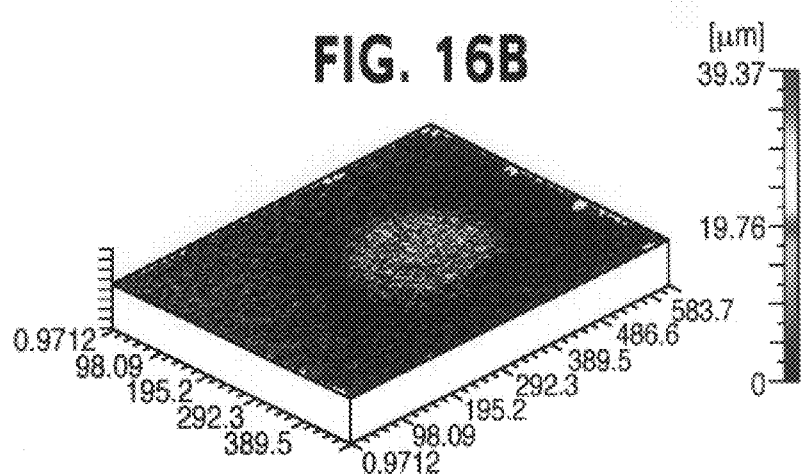
Figure 16C:
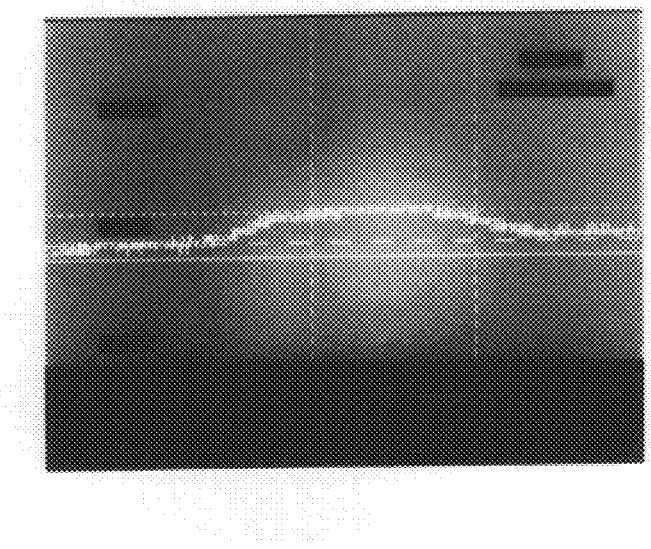

In addition, FIGS. 16A to 16C are views illustrating a concrete example of a scratch after repair, the respective figures corresponding to FIGS. 15A, 15B and 15C, respectively.

From these results, it is apparent that a scratch before repair, such as a shell-shaped large scratch and a deep scratch observed centrally of the large scratch has been subjected to local supplying and curing of the above-described filler to be repaired to such an extent that it cannot be visually perceived in the bright view field.

Table 1 shows results of examples, in which the above-described method was used to repair scratches on a glass surface, and indicates relationships among a scratch depth, a height (H: a difference between a filler surface and a glass surface) of a filler after curing, a minimum width of the filler (W), a tapered angle at an edge of the filler, and an external appearance (corresponding to the display characteristic during lighting) checked after sticking of a polarizer.

As apparent from the result, when a scratch on a glass surface is filled with a filler to be repaired and a polarizer is stuck to the glass surface through the usual processing to complete a liquid crystal display, substantially the same display quality as that of a display with no scratch thereon can be secured by controlling a difference in level for and a configuration at an edge of the filler and the like.

As described above, liquid crystal displays heretofore discarded as defective products because of a scratch or scratches present on a glass surface are restored as good products, thereby contributing to saving in resources, production energies and the like in the society, and contributing much to enhancement of product yield, cost reduction, and the like in enterprises.

Moreover, it goes without saying that the above-described embodiments can be applied to repairing in display sections not only of TFT-LCD, but also of other non-light emitting and light emitting type image display devices, and can also be applied to PDP, electroluminescence elements, flat Braun tubes, and other displays.

As described above, according to the present invention, the presence of a scratch on a glass surface cannot be perceived visually by locally supplying a filler to the scratch, and when applied, for example, to repairing of a scratch on a glass surface of TFT-LCD, a portion repaired can in no way offer any significant difference in display quality to a portion surrounding the repaired portion.

While we have shown and described several embodiments in accordance with out invention, it should be understood that disclosed embodiments are susceptible of changes and modifications without departing from the scope of the invention. Therefor, we do not intend to be bound by the details shown and described herein but intend to cover all such changes and modifications a fall within the amabit of the appended claims.

What is claimed is:

1. An image display device comprising a light transmitting member having an image display section, and wherein a scratch or scratches on inside and outside surfaces of the light transmitting member are locally filled with a filler, which has a refractive index equivalent to or on the same order of that of the light transmitting member, and a difference in level between a surface of the said light transmitting member and the surface of said filler is at least ±5.0 µm.

2. An image display device comprising a light transmitting member having an image display section, and wherein a scratch or scratches on inside and outside surfaces of the light transmitting member are locally filled with a filler, which has a refractive index equivalent to or on the same order of that of the light transmitting member, and wherein a scratch or scratches on the surface and the back surface of the light transmitting member are locally filled with a filler having a refractive index equal to that of the light transmitting member, and a ratio H/W of a difference (H) in level between a surface of the light transmitting member and a surface of the filler to a minimum width (W) of the filler is at least 0.1 or less.

3. An image display device comprising a light transmitting member having an image display section, and wherein a scratch or scratches on inside and outside surfaces of the light transmitting member are locally filled with a filler, which has a refractive index equivalent to or on the same order of that of the light transmitting member, and wherein an angle defined between a surface of the filler and a surface of the light transmitting member in an area where an edge of the filler contacts a surface of the light transmitting member is at least 45 degrees or less.

4. An image display device comprising a light transmitting member having an image display section, and wherein a scratch or scratches on inside and outside surfaces of the light transmitting member are locally filled with a filler, which has a refractive index equivalent to or on the same order of that of the light transmitting member, and wherein an angle defined between a surface of the filler and a surface of the light transmitting member in an area where an edge of the filler contacts a surface of the light transmitting member is at least 10 degrees or less.

5. The image display device according to one of claims 1 to 4, wherein the edge of the filler has a cross sectional shape such that the edge continuously contacts the surface of said light transmitting member in a smooth curved line.

6. The image display device according to claim 1, wherein an angle defined between a surface of the filler and a surface of the light transmitting member in an area where an edge of the filler contacts a surface of the light transmitting member is at least 45 degrees or less.

7. The image display device according to claim 1, wherein an angle defined between a surface of the filler and a surface of the light transmitting member in an area where an edge of the filler contacts a surface of the light transmitting member is at least 10 degrees or less.

8. An image display device comprising a light transmitting member having an image display section, a film of optical function, and an adhesive bonding layer, the film of optical function being arranged on the light transmitting member through the adhesive bonding layer, and wherein a scratch or scratches on a surface of the light transmitting member contacting the adhesive bonding layer is locally filled with a filler having a refractive index equivalent to or on the same order of that of the light transmitting member, and a ratio H/W of a difference in level (H) between a surface of the light transmitting member and a surface of the filler to a minimum width (W) of the filler is at least 0.1 or less.

9. The image display device according to claim 8, wherein a difference in level (H) between the surface of the light transmitting member and the surface of said filler has a thickness at least half or less of that of the adhesive bonding layer.

10. The image display device according to claim 8, wherein the film of optical function is a polarizer.

* * * * *